(12) United States Patent
Yoshino et al.

(10) Patent No.: US 6,900,611 B2
(45) Date of Patent: May 31, 2005

(54) RECORDING APPARATUS (75) Inventors: Hiroshi Yoshino, Kanagawa (JP); Yuji Nakano, Kanagawa (JP); Haruyuki Yanagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 09/971,649

(22) Filed: Oct. 9, 2001

(65) Prior Publication Data

US 2002/0044516 A1 Apr. 18, 2002

(30) Foreign Application Priority Data

Oct. 16, 2000 (JP) ........................................ 2000-315004

(51) Int. Cl.$^7$ ................................................. B41J 29/00
(52) U.S. Cl. ...................................... 318/696; 318/685
(58) Field of Search ................................ 318/696, 685, 318/603, 632, 254, 268, 138, 439, 611, 619; 271/116, 117, 122; 400/322, 903

(56) References Cited

U.S. PATENT DOCUMENTS

| | | | |
|---|---|---|---|
| 5,412,302 A | * 5/1995 | Kido et al. ................ | 318/685 |
| 5,540,427 A | 7/1996 | Nitta et al. ................ | 271/274 |
| 5,580,042 A | 12/1996 | Taniguro et al. ............ | 271/274 |
| 5,620,174 A | 4/1997 | Taniguro et al. .......... | 271/10.12 |
| 5,648,808 A | 7/1997 | Yanagi et al. ............... | 347/104 |
| 5,672,019 A | 9/1997 | Hiramatsu et al. .......... | 400/624 |
| 5,725,319 A | 3/1998 | Saito et al. ................ | 400/629 |
| 5,887,866 A | * 3/1999 | Yamauchi et al. .......... | 271/116 |
| 5,918,873 A | 7/1999 | Saito et al. .............. | 271/10.11 |
| 5,998,956 A | * 12/1999 | Saito .......................... | 318/696 |
| 6,168,270 B1 | 1/2001 | Saikawa et al. ............ | 347/104 |
| 6,305,682 B1 | 10/2001 | Saito et al. .............. | 271/10.11 |
| 6,331,002 B1 | 12/2001 | Yoshino et al. ............. | 271/117 |

* cited by examiner

*Primary Examiner*—Ali Neyzari
(74) *Attorney, Agent, or Firm*—Fitzpatrick, Cella, Harper & Scinto (57) ABSTRACT

A recording apparatus includes a feed roller which feeds a paper sheet, a feed motor which drives the feed roller, and a loss-of-synchronism detecting unit which detects loss of synchronism of the feed motor. When loss of synchronism of the feed motor is detected by the loss-of-synchronism detecting unit, the rotational speed of the feed motor is reduced stepwise. Accordingly, it is not necessary to provide a high operational margin in the motor, and a recording apparatus, in which the motor and power supply costs are reduced, can be provided.

10 Claims, 7 Drawing Sheets

FIG. 7

RECORDING APPARATUS

BACKGROUND OF THE INVENTION

1. Field of the Invention

The present invention relates to recording apparatuses in which stepping motors are used as driving means.

2. Description of the Related Art

Conventionally, DC motors and stepping motors are used in recording apparatuses as driving means. In the case in which DC motors are used, it is necessary to install encoders, etc., and construct closed-loop control systems. Thus, in low-cost-type recording apparatuses, stepping motors are used in order to reduce costs.

However, when the load torque of the recording apparatus exceeds the drive torque of the stepping motor, loss of synchronism occurs and the stepping motor cannot be controlled. Accordingly, in a conventional recording apparatus, the stepping motor is controlled such that loss of synchronism does not occur even in the worst environments and conditions under which the recording apparatus may be used, so that the operation of the motor is ensured. However, when the motor is controlled as such, it must have a high operational margin, and the motor and power supply costs for the recording apparatus are increased.

In addition, even when the rotation of the motor can be recovered after loss of synchronism has occurred, the recording position at which a recording head records on a record medium is displaced since the front end position of the record medium cannot be determined accurately. Accordingly, there is a problem in that, if loss of synchronism occurs, the record medium that has been transferred must be taken out while it is still blank and a new record medium must be fed in.

SUMMARY OF THE INVENTION

Accordingly, it is an object of the present invention to provide a recording apparatus in which a stepping motor is used, and the rotation of the motor can be recovered when loss of synchronism has occurred, so that it is not necessary to provide a high operational margin in the motor, and the motor and power supply costs are reduced.

In addition, another object of the present invention is to provide a recording apparatus which, even when loss of synchronism has occurred, determines the start position of a record medium and records on the record medium with accuracy.

In addition, another object of the present invention is to provide a recording apparatus, which includes a recording unit which records on a record medium; a feed roller which feeds the record medium to such a position that the record medium opposes the recording unit; a stepping motor which drives the feed roller; and a loss-of-synchronism detecting unit which detects loss of synchronism of the stepping motor, and in which, when loss of synchronism of the stepping motor is detected by the loss-of-synchronism detecting unit, the rotational speed of the stepping motor is reduced stepwise.

In addition, another object of the present invention is to provide a recording apparatus, which includes a recording unit which records on a record medium; a feed roller which feeds the record medium to such a position that the record medium opposes the recording unit; a stepping motor which drives the feed roller; and a loss-of-synchronism detecting unit which detects loss of synchronism of the stepping motor, and in which, when loss of synchronism of the stepping motor is detected by the loss-of-synchronism detecting unit, the rotational speed of the stepping motor is reduced stepwise at parts around a point at which loss of synchronism has occurred.

Further objects, features and advantages of the present invention will become apparent from the following description of the preferred embodiments (with reference to the attached drawings).

DESCRIPTION OF THE PREFERRED EMBODIMENTS

Embodiments of the present invention will be described below with reference to the accompanying drawings.

First Embodiment

Figure 1:
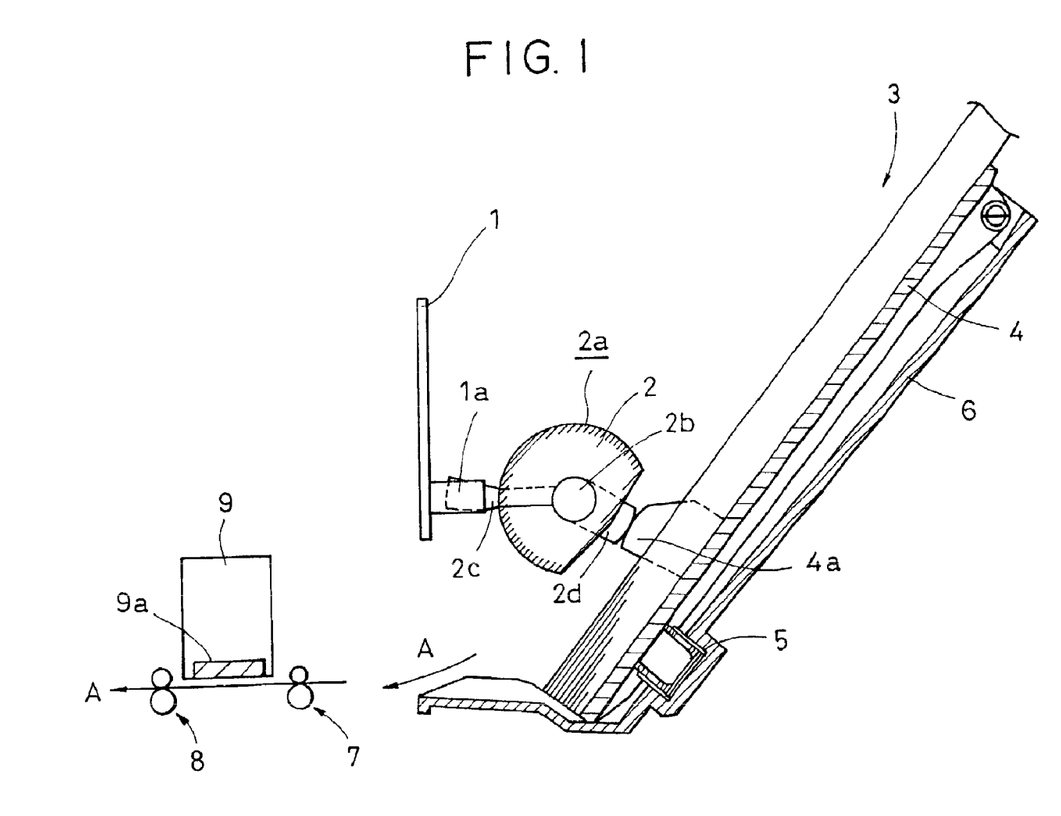
FIG. 1 is a schematic sectional view of a recording apparatus according to a first embodiment.
Figure 2:
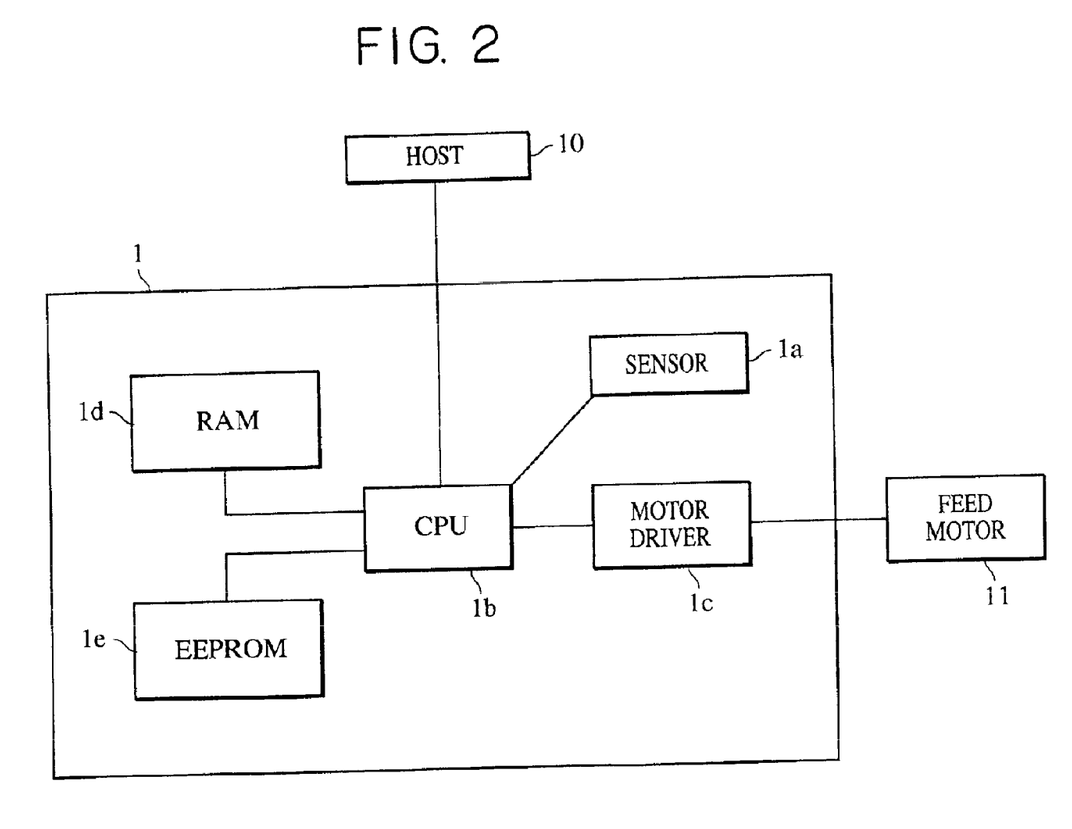
FIG. 2 is a diagram showing a schematic construction of a control system of the recording apparatus.

A first embodiment of the present invention will be described below with reference to FIGS. 1 to 4. FIG. 1 is a schematic sectional view of a recording apparatus according to the first embodiment of the present invention, and FIG. 2 is a diagram showing a schematic construction of a control system of the recording apparatus.

In FIG. 1, reference numeral 1 denotes a main board which controls the recording apparatus, 2 denotes a feed roller which feeds a paper sheet 3, which are record media, to the recording apparatus, 4 denotes a pressure plate which receives a stack of paper sheets and presses it against the feed roller 2, 5 denotes a pressing spring which presses the pressure plate 4 toward the feed roller 2, and 6 denotes an automatic sheet feeder (ASF) base which supports the pressure plate 4 in a pivotable manner. In addition, 7 denotes a pair of transfer rollers which transfer the paper sheet 3 that is fed by the feed roller 2, 8 denotes a pair of discharge rollers which discharge the paper sheet 3 from the recording apparatus, and 9 denotes a carriage on which a recording head 9a, which records on the paper sheet 3, is mounted.

The feed roller 2 includes a rubber portion 2a which comes into contact with the surface of the paper sheet 3; a roller shaft 2b which is the rotational center of the feed roller 2; a sensor flag 2c which blocks light at a sensor 1a, which is provided on the main board 1, so that the angle of rotation can be detected; and a cam 2d which pushes the pressure plate 4 downward. The feed roller 2 is driven by a driving force applied by a feed motor, which is not shown FIG. 1. The length along the arc-shaped part of the rubber portion 2a is sufficient to transfer the front ends of the paper sheet 3 to the transfer rollers 7 by one turn.

The sensor 1a is a transmission-type light sensor including a light emitting device and a light receiving device, and a slit-shaped detecting member is provided at the midsection thereof in the vertical direction in FIG. 1.

The pressure plate 4 is constructed such that it is able to move toward and away from the feed roller 2 in accordance with the rotation of the feed roller 2. When the arc-shaped part of the rubber portion 2a opposes the paper sheet 3, the feed roller 2 comes into contact with the paper sheet 3 due to the elastic force of the pressing spring 5. The pressure plate 4 moves toward and away from the feed roller 2 in accordance with the movement of a cam follower 4a, which follows the movement of the cam 2d of the feed roller 2.

Next, a circuit for driving a feed motor 11, which generates a driving force for the feed roller 2, will be described below with reference to FIG. 2.

In FIG. 2, reference numeral 1b denotes a CPU which controls the entire operation of the recording apparatus, 1c denotes a motor driver which controls the feed motor 11, 1d denotes a RAM which temporarily memorizes a constant, 1e denotes an EEPROM which stores operation parameters such as a control table for the feed motor 11, etc. In addition, 10 denotes a host which is disposed inside or outside the recording apparatus, and which transmits a record command to the CPU 1b.

Next, a feeding operation of the recording apparatus having the above-described construction will be described below. When a record command is issued from the host 10 to the CPU 1b, the CPU 1b commands the motor driver 1c to drive the feed motor 11. Accordingly, the feed roller 2 starts to rotate, and the feeding operation is started. When the feed roller 2 starts to rotate, the cam 2d comes away from the cam follower 4a of the pressure plate 4, and the pressure plate 4 is pressed toward the feed roller 2 by the pressing spring 5. Then, one of the paper sheets which is placed at the top is picked up and is fed toward such a position that it opposes the recording head 9a.

Then, when the feed roller 2 is rotated still further, the front end of the paper sheet 3 knocks against a nip portion of the transfer rollers 7, which are stationary. Then, the feed roller 2 temporarily stops rotating immediately before pressing the pressure plate 4 downward. And then, the transfer rollers 7 and the feed roller 2 start to rotate at the same circumferential speed, and the paper sheet 3 is transferred by being nipped between the transfer rollers 7. The cam 2d of the feed roller 2 pushes the cam follower 4a of the pressure plate 4 downward, and the feed roller 2 stops rotating at the position shown in FIG. 1. Accordingly, the feeding operation is completed. Then, the recording head 9a starts to record on the paper sheet 3 while it is transferred by the transfer rollers 7.

Next, a method for detecting the phase of the feed roller 2 will be described below. When the sensor flag 2c of the feed roller 2 blocks light at the sensor 1a provided on the main board 1, it determines that the feed roller 2 is at a predetermined phase.

Figure 3:
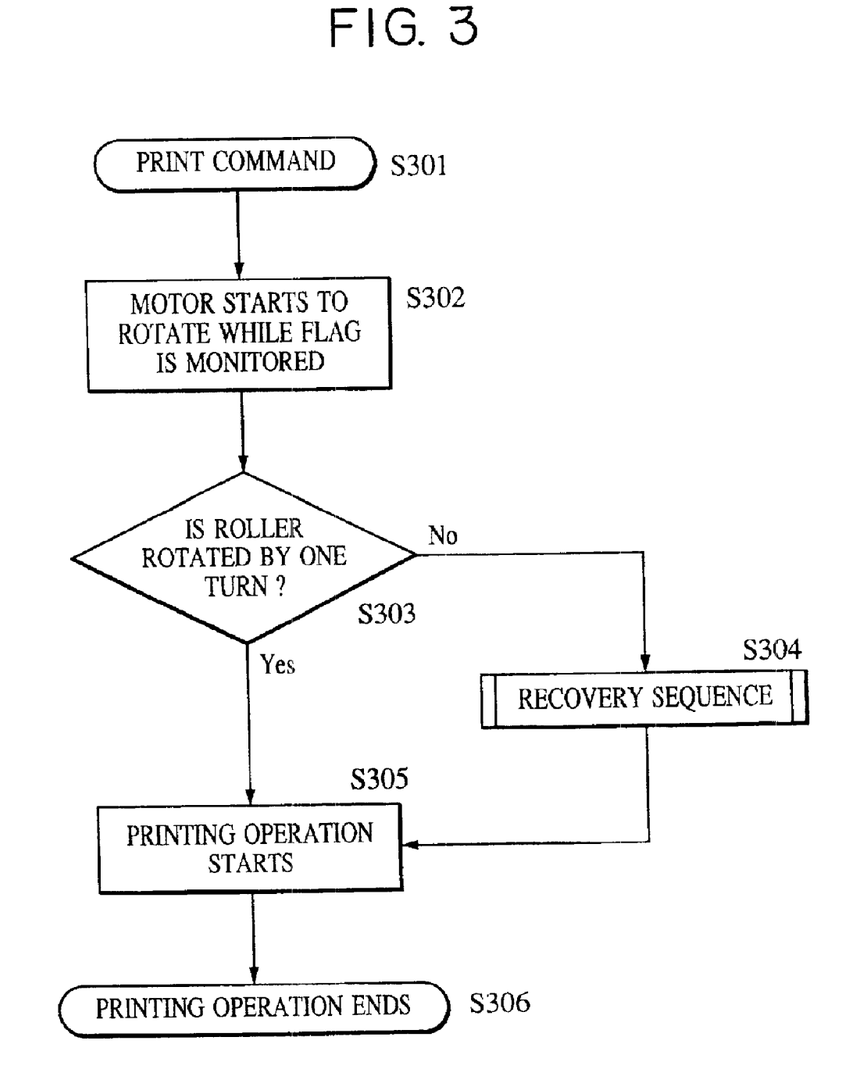
FIG. 3 is a flowchart of a recording operation of the recording apparatus.

Next, an operation of the recording apparatus in a case in which loss of synchronism is likely to occur, for example, in a case in which paper sheets having a high feed resistance are used, will be described below with reference to FIG. 3.

When a record command is issued at S301, the feed roller 2 starts to rotate while the sensor 1a monitors the sensor flag 2c at S302. After the rear end of a light-blocking member of the sensor flag 2c in the rotating direction is detected by the sensor 1a, the feed motor 11 is driven for a predetermined number of pulses. Then, when the front end of the light-blocking member in the rotating direction has been detected after the feed motor 11 has been driven for the predetermined number of pulses, it is determined that the feed roller 2 is rotated by one turn (S303), and a recording operation starts at S305. Alternatively, when the front end of the light-blocking member in the rotating direction cannot be detected after the feed motor 11 has been driven for the predetermined number of pulses, it is determined that the feed roller 2 is not rotated by one turn (S303).

In the case in which it is determined that the feed roller 2 is not rotated by one turn, it is determined that loss of synchronism has occurred while the feed roller 2 was being rotated, and a recovery sequence from loss of synchronism is performed at S304. The feed roller 2 incurs a maximum rotational load when the cam 2d pushes the pressure plate 4 downward, and loss of synchronism of the feed motor 11 is most likely to occur at this point. Accordingly, in the first embodiment, the recovery sequence enables the feed motor to recover from loss of synchronism when it has occurred at the point at which the cam 2d of the feed roller 2 pushes the pressure plate 4 downward. At this time, the front end of the paper sheet 3 is already nipped between the transfer rollers 7. In addition, the pressure plate 4 is pressed toward the feed roller 2, and the paper sheets are nipped between the pressure plate 4 and the feed roller 2.

In the feeding operation, the feed roller 2 sometimes pushes the paper sheet 3 toward the transfer rollers 7 at the same time as the transfer rollers 7 catch the front end of the paper sheet 3. Also in this case, the feed roller 2 temporarily receives load, and loss of synchronism of the feed motor 11 may occur. At this time, the front end of the paper sheet 3 is stopped in front of the transfer rollers 7, and the pressure plate 4 is pressed toward the feed roller 2.

Figure 4:
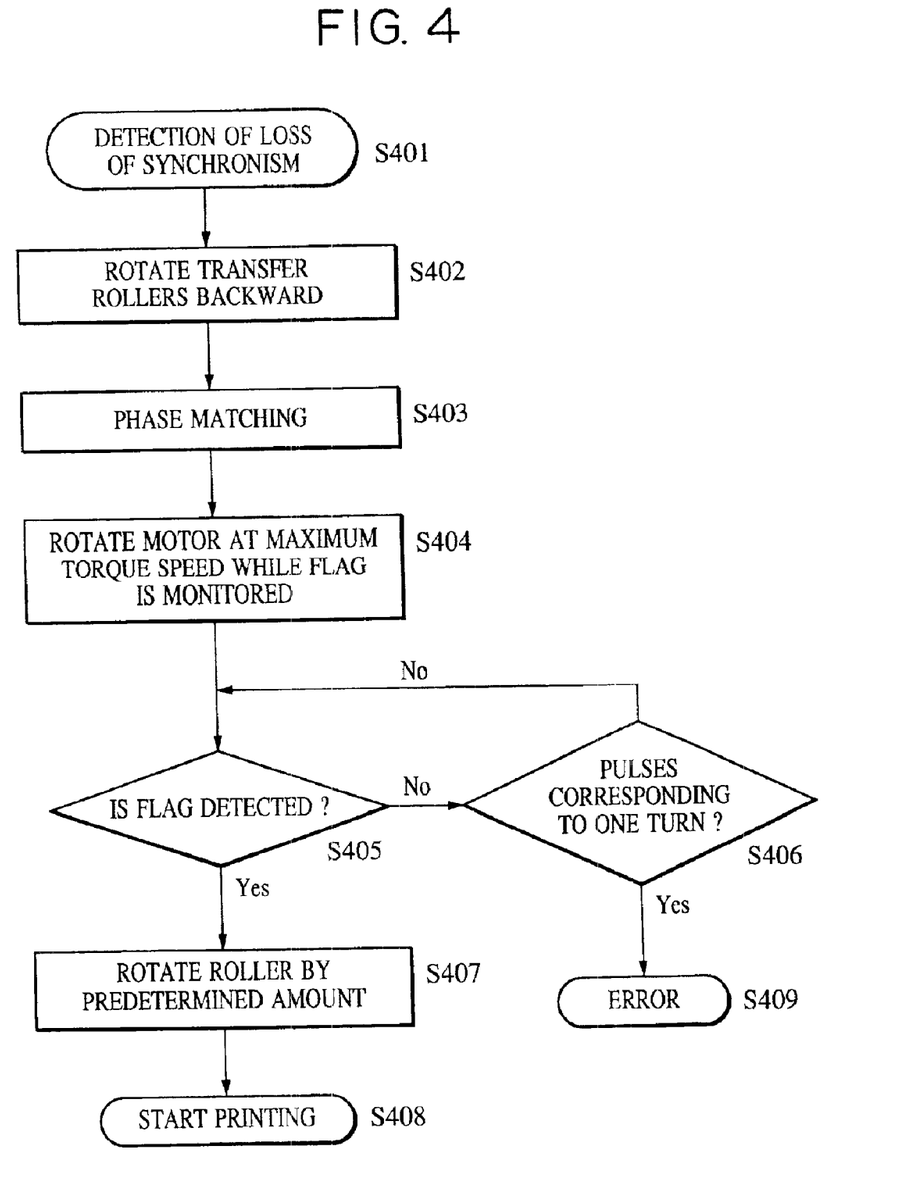
FIG. 4 is a flowchart of a recovery sequence from loss of synchronism according to the first embodiment.

FIG. 4 is a flowchart of the recovery sequence from loss of synchronism according to the first embodiment. When loss of synchronism of the feed motor 11 is detected at S401, which corresponds to S303 in FIG. 3, the transfer rollers 7 are rotated backward by a predetermined amount. This is done in order to move the front end of the paper sheet 3 backward in the transferring direction if it is caught by the transfer rollers 7. Since the feed roller 2 is pressed toward the pressure plate 4, the front end of the paper sheet 3 stops at such a position that it abuts against the nip portion of the transfer rollers 7. Accordingly, the front end position of the paper sheet 3, which has become uncertain due to loss of synchronism of the feed motor 11, can be determined again. More specifically, the front end position of the paper sheet 3 can be determined based on the amount by which the transfer rollers 7 are rotated after the front end of the paper sheet 3 is positioned in front of the nip portion. Thus, even when loss of synchronism of the feed motor 11 has occurred, the front end position of the paper sheet 3 can be accurately determined, and the recording operation can be performed with accuracy.

Next, phase matching of the feed motor 11 is performed (S403). In phase matching, the feed motor 11 is rotated at a sufficiently low rotational speed, and the excitation phase of the motor, which has become uncertain due to loss of synchronism, is determined. Then, the feed motor 11 is driven at a rotational speed at which the maximum torque can be generated (S404). At this time, the transfer rollers 7 are also rotated at the same circumferential speed as the feed roller 2. After the front end of the light-blocking member of the sensor flag 2c in the rotational direction has been detected by the sensor 1a (S405), the feed roller 2 is rotated for a predetermined number of pulses, and is then stopped (S407). And then, the recording operation is started (S408). The number of pulses is determined such that the feed motor 11 can rotate the feed roller 2 back to the initial position shown in FIG. 1 after the front end of the light-blocking member has been detected by the sensor 1a.

In the case in which the sensor flag 2c has still not been detected at S405 after the feed motor 11 has been rotated for the number of pulses corresponding to one turn of the feed roller 2 (S406), it is determined that some form of malfunction has occurred in the feed roller 2. In such a case, the error is reported to the user (S409).

When the required recording accuracy is not very high, the backward rotation of the transfer rollers 7 may be omitted. In such a case, loss of synchronism of the feed motor 11 is assumed to have occurred when the pressure plate 4 was pushed downward, and the front end position of the paper sheet 3 is calculated from the phase of the feed roller 2 at that time. Accordingly, the feeding operation can be completed more quickly after loss of synchronism has occurred.

As described above, according to the first embodiment, when loss of synchronism of the feed motor 11 has occurred, the following operations are performed on the assumption that it has occurred at the point at which the feed roller 2 is likely to receive a high load. Accordingly, the recording operation can be performed with accuracy.

In addition, in the case in which the transfer rollers 7 are rotated backward by a predetermined amount before the recovery operation from loss of synchronism is performed, the front end position of the paper sheet 3 is accurately determined, and the recording operation can be performed with greater accuracy.

Second Embodiment

In a second embodiment, the mechanical construction and the control structure are the same as those in the first embodiment. The second embodiment is characterized in that the recovery operation from loss of synchronism is performed stepwise.

Figure 5:
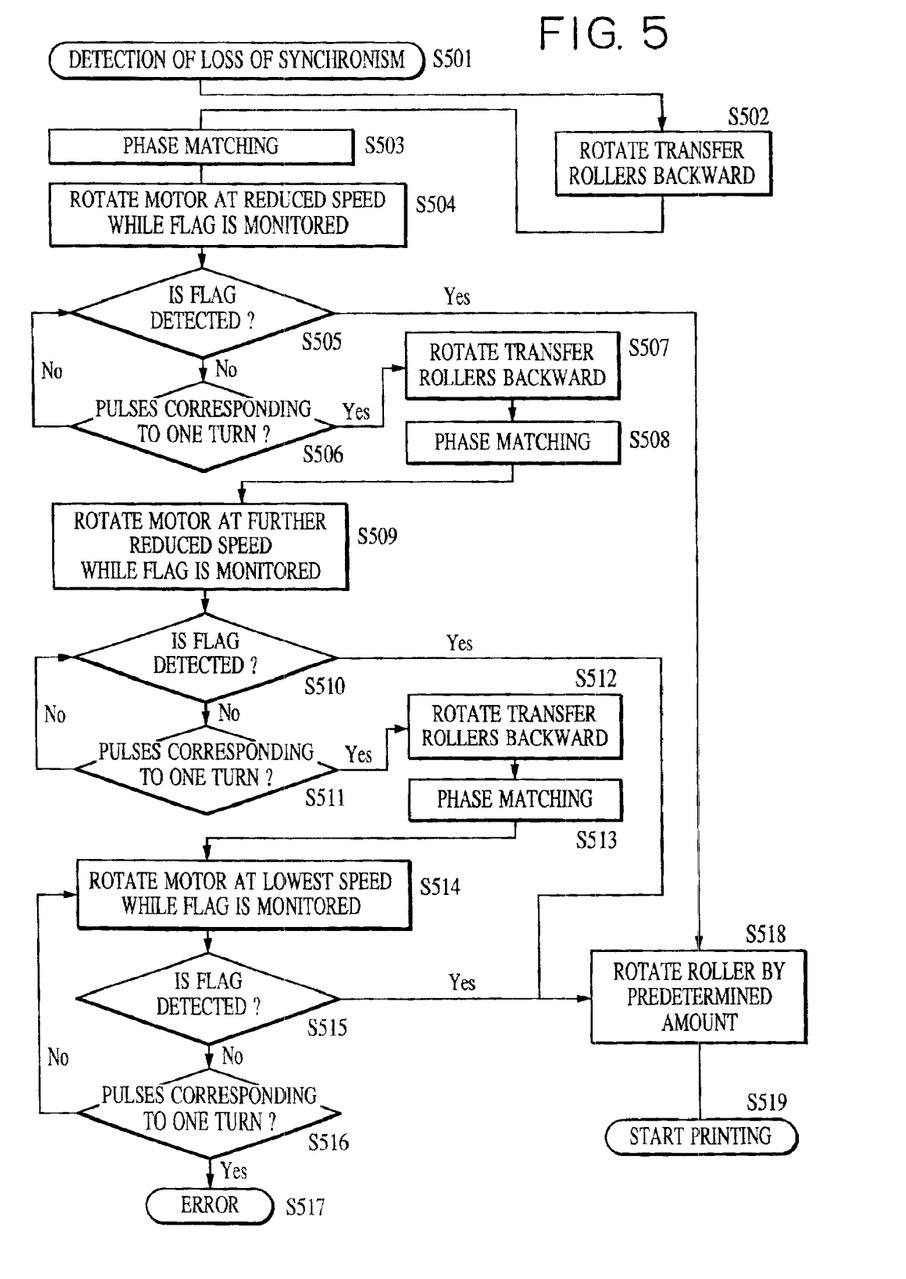
FIG. 5 is a flowchart of a recovery sequence from loss of synchronism according to a second embodiment.

FIG. 5 is a flowchart of the recovery sequence from loss of synchronism according to the second embodiment. As in the first embodiment, when loss of synchronism is detected at S501, the transfer rollers 7 are rotated backward by a predetermined amount (S502), and the phase matching of the feed motor 11 is performed (S503). Then, the feed motor 11 is rotated at a reduced rotational speed (S504), and the feed roller 2 is rotated by a predetermined amount (S518) after the sensor flag 2c of the feed roller 2 is detected (S505). Then, the recording operation is started (S519). In the case in which the sensor flag 2c has still not been detected at S505 after the feed motor 11 is rotated for the number of pulses corresponding to one turn of the feed roller 2 (S506), it is determined that the rotation of the feed roller 2 has not recovered.

In such a case, the transfer rollers 7 are once again rotated backward (S507) and the phase matching of the feed motor 11 is once again performed (S508). Then, the feed motor 11 is rotated at a further reduced rotational speed (S509), and the feed roller 2 is rotated by a predetermined amount (S518) after the sensor flag 2c of the feed roller 2 has been detected (S510). Then, the recording operation is started (S519). In a case in which the sensor flag 2c has still not been detected at S510 after the feed motor 11 has been rotated for the number of pulses corresponding to one turn of the feed roller 2 (S511), the transfer rollers 7 are once again rotated backward (S512) and the phase matching of the feed motor 11 is once again performed (S513). Then, the feed motor 11 is rotated at the lowest rotational speed (S514). Following operations are the same as those in the first embodiment.

Although the rotational speed of the feed motor 11 is reduced by two steps before it is rotated at the lowest rotational speed in the above-described second embodiment, the number of steps by which the rotational speed is reduced may be changed. For example, the number of steps before the rotational speed is reduced to the lowest value may also be one; that is, S509 to S511 may be omitted. Alternatively, the number of steps may also be increased; that is, steps similar to S509 to S511 may be added and repeated before S514.

As described above, according to the second embodiment, it is not necessary to reduce the rotational speed of the feed motor 11 by a large amount when loss of synchronism of the feed motor 11 has occurred, and the feeding operation can be completed more quickly.

Third Embodiment

In a third embodiment, the mechanical construction and the control structure are the same as those in the first embodiment. The third embodiment is characterized in that the point at which loss of synchronism has occurred is memorized. When the feed motor 11 starts to rotate again, the rotational speed is reduced around the point at which loss of synchronism has occurred, so that the reoccurrence of loss of synchronism can be prevented.

Figure 6:
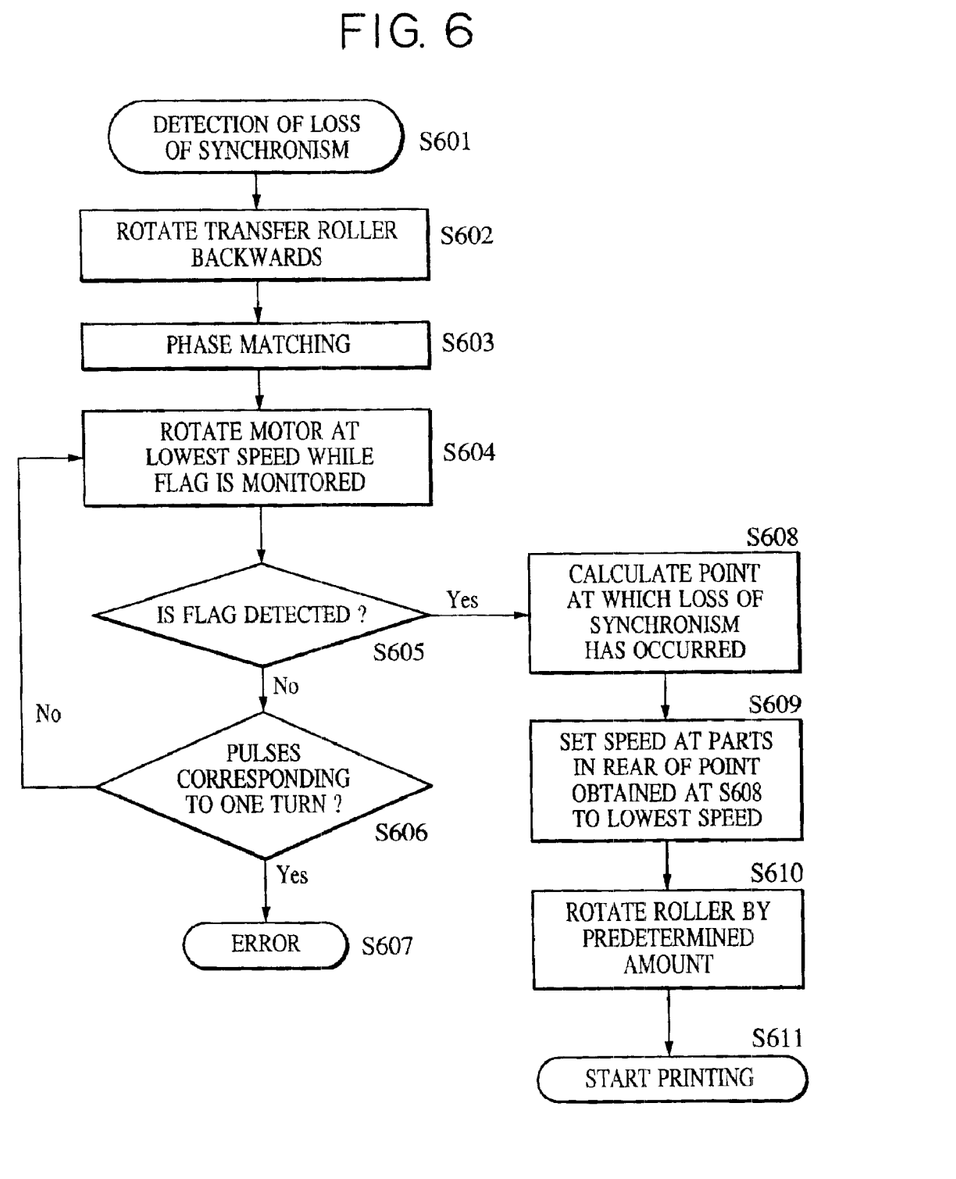
FIG. 6 is a flowchart of a recovery sequence from loss of synchronism according to a third embodiment.

FIG. 6 is a flowchart which shows a recovery sequence from loss of synchronism according to the third embodiment. S601 to S606 are the same as in the first embodiment. The number of pulses from the point at which the rotation of the feed motor 11 is restarted at a reduced rotational speed (S604) to the point at which the sensor flag 2c is detected at S605 is counted, so that the point at which loss of synchronism has occurred can be determined (S608). When the feed motor 11 is driven again, a drive table of the feed motor 11 is changed such that the rotational speed is reduced, so that a larger torque can be generated, at parts around and to the rear of the point at which loss of synchronism has occurred. Accordingly, the drive torque of the feed motor 11 is increased at parts around and to the rear of the point at which loss of synchronism has occurred, so that reoccurrence of loss of synchronism can be prevented.

The rotational speed of the feed motor 11 may also be reduced stepwise as described in the second embodiment.

As described above, according to the third embodiment, in the case in which a plurality of paper sheets is fed, the number of occurrences of loss of synchronism can be reduced, and the recording operation can be performed at a high speed.

Fourth embodiment

In a fourth embodiment, the roller shaft 2b of the feed roller 2 is provided with a strain gauge for detecting the load torque applied thereto at a position close to an input portion thereof.

Figure 7:
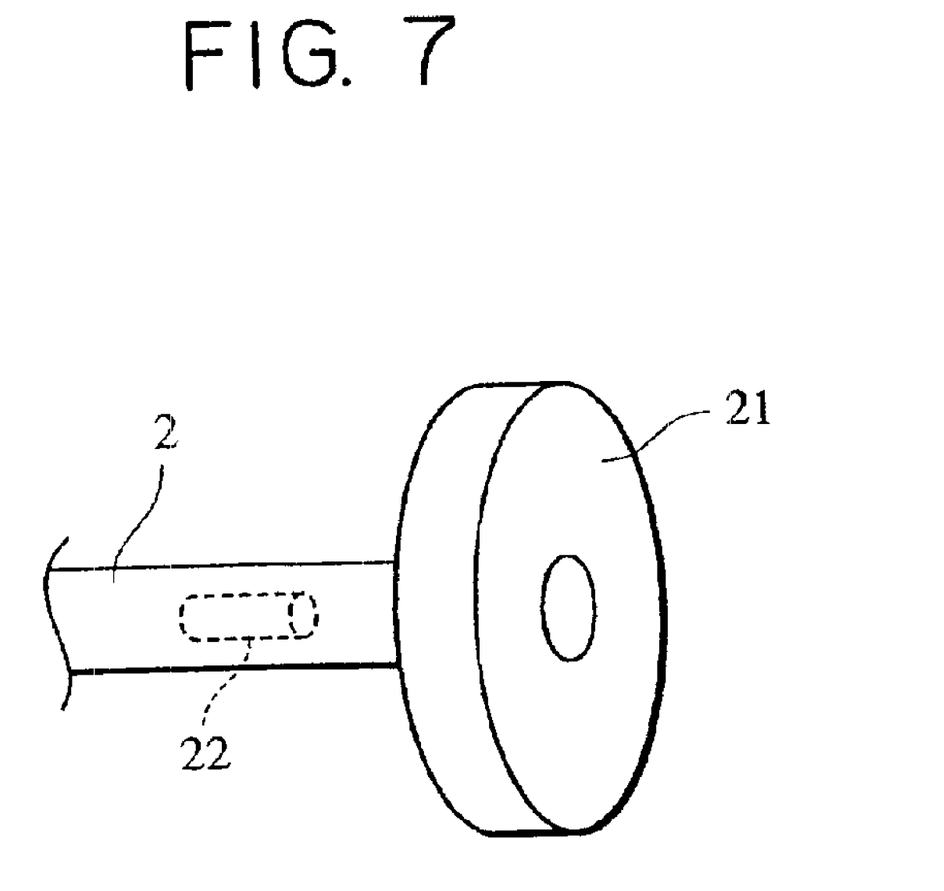
FIG. 7 is a diagram showing a strain gauge according to a fourth embodiment.

FIG. 7 is a diagram showing a strain gauge according to the fourth embodiment. Reference numeral 21 denotes a feed gear, which is attached to the roller shaft 2b of the feed roller 2 and which transfers the driving force applied by the feed motor 11 to the feed roller 2, and 22 denotes a strain gauge which is disposed in the roller shaft 2b of the feed roller 2.

The feeding operation according to the fourth embodiment will be described below. First, the feed roller 2 is rotated by one turn as described in the first embodiment. During the rotation of the feed roller 2, the load torque applied to the roller shaft 2b is monitored by the strain gauge 22. Then, an optimum driving speed is calculated based on the history of the load torque during one turn of the feed roller 2 and torque-speed characteristics of the feed motor 11, and the drive table of the feed motor 11 stored in the EEPROM 1e is updated. Then, when the feed roller 2 is rotated afterwards, the feed motor 11 is driven according to the updated drive table at the maximum speed within the range in which loss of synchronism can be prevented.

Each feed motor has individual torque-speed characteristics. Accordingly, when recording devices are shipped from factories, EEPROMs of the recording devices individually store torque-speed characteristics of the feed motors contained therein.

The torque-speed characteristics stored in the EEPROM may be different from the actual characteristics due to deterioration and degradation of the components of the motor and of the roller-driving mechanism.

When loss of synchronism has occurred, a recovery sequence similar to that in the first embodiment is performed, so that rotation of the feed motor 11 is recovered. Then, the rotational speed of the feed motor 11 and the drive torque applied to the feed roller 2 at the point at which loss of synchronism occurred is calculated based on the history of the rotational load torque obtained by the strain gauge 22, the point at which loss of synchronism has occurred, and the drive table of the motor stored in the EEPROM. The torque-speed characteristics and the motor drive table are corrected in accordance with the result of the calculation, so that the characteristics of the motor stored in the EEPROM can be made the same as the actual characteristics of the motor. Accordingly, an operation in which the ability of the motor is fully exploited can be realized.

As described above, according to the fourth embodiment, the performance of the motor can be improved by increasing the drive torque, driving speed, etc., to the maximum extent in accordance with the rotational load applied to the feed roller 2 during one turn.

Accordingly, in the above-described embodiments, the rotation of the motor can be recovered when loss of synchronism has occurred. Thus, it is not necessary to provide a high operational margin in the motor, and the motor and power supply costs can be reduced. In addition, a recording apparatus in which, even when loss of synchronism has occurred, the front end position of the record medium is accurately detected and recording is performed with accuracy, can be provided. Furthermore, since the feed motor 11 is controlled under the optimal conditions in accordance with the torque-speed characteristics, the speed of the recording operation can be increased.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus which records on a record medium by recording means, the recording apparatus comprising:
   a feed roller which feeds the record medium to such a position that the record medium opposes the recording means;
   a stepping motor which drives the feed roller; and
   loss-of-synchronism detecting means which detects loss of synchronism of the stepping motor;
   wherein, when loss of synchronism of the stepping motor is detected by the loss-of-synchronism detecting means, the rotational speed of the stepping motor is reduced stepwise.

2. A recording apparatus according to claim 1, wherein the loss-of-synchronism detecting means comprises a sensor flag which is provided on the feed roller and a sensor which is provided on a main body of the recording apparatus.

3. A recording apparatus which records on a record medium by recording means, the recording apparatus comprising:
   a feed roller which feeds the record medium to such a position that the record medium opposes the recording means;
   a stepping motor which drives the feed roller; and
   loss-of-synchronism detecting means which detects loss of synchronism of the stepping motor;
   wherein, when loss of synchronism of the stepping motor is detected by the loss-of-synchronism detecting means, the rotational speed of the stepping motor is reduced at parts around a point at which loss of synchronism has occurred.

4. A recording apparatus according to claim 3, wherein the loss-of-synchronism detecting means comprises a sensor flag which is provided on the feed roller and a sensor which is provided on a main body of the recording apparatus.

5. A recording apparatus which records on a record medium by recording means, the recording apparatus comprising:
   a feed roller which feeds the record medium to such a position that the record medium opposes the recording means;
   a stepping motor which drives the feed roller; and
   loss-of-synchronism detecting means which detects loss of synchronism of the stepping motor;
   wherein, when loss of synchronism of the stepping motor is detected by the loss-of-synchronism detecting means, the rotational speed of the stepping motor is reduced stepwise at parts around a point at which loss of synchronism has occurred.

6. A recording apparatus according to claim 5, wherein the loss-of-synchronism detecting means comprises a sensor flag which is provided on the feed roller and a sensor which is provided on a main body of the recording apparatus.

7. A recording apparatus which records on a record medium by recording means, the recording apparatus comprising:
   a feed roller which feeds the record medium to such a position that the record medium opposes the recording means;
   a pair of transfer rollers which are disposed in rear of the recording means in the feeding direction and which transfer the record medium;
   a stepping motor which drives the feed roller; and
   loss-of-synchronism detecting means which detects loss of synchronism of the stepping motor;
   wherein, when loss of synchronism of the stepping motor is detected by the loss-of-synchronism detecting means, the pair of transfer rollers are rotated backwards.

8. A recording apparatus which records on a record medium by recording means, the recording apparatus comprising:
   a feed roller which feeds the record medium to such a position that the record medium opposes the recording means;
   load torque detecting means which detects a load torque applied to the feed roller;
   a stepping motor which drives the feed roller; and
   drive torque memorizing means which memorizes a drive torque corresponding to the rotational speed of the stepping motor,
   wherein, the rotational speed of the stepping motor is determined based on data obtained from the load torque detecting means and the drive torque memorizing means.

9. A recording apparatus according to claim 8, wherein the load torque detecting means comprises a strain gauge which is provided in a roller shaft of the feed roller.

10. A recording apparatus according to claim 8, further comprising loss-of-synchronism detecting means which detects loss of synchronism of the stepping motor, wherein, when loss of synchronism of the stepping motor is detected by the loss-of-synchronism detecting means, the drive torque memorized in the drive torque memorizing means is updated.

* * * * *

UNITED STATES PATENT AND TRADEMARK OFFICE
CERTIFICATE OF CORRECTION

PATENT NO. : 6,900,611 B2
DATED : May 31, 2005
INVENTOR(S) : Hiroshi Yoshino et al.

It is certified that error appears in the above-identified patent and that said Letters Patent is hereby corrected as shown below:

Column 3,
Line 60, "flag" should read -- flag --.

Signed and Sealed this

Thirteenth Day of September, 2005

JON W. DUDAS
*Director of the United States Patent and Trademark Office*